(12) United States Patent
Desbois-Renaudin et al.

(10) Patent No.: US 12,211,980 B2
(45) Date of Patent: Jan. 28, 2025

(54) ELECTRIC STORAGE CELL MODULE AND BATTERY COMPRISING A PLURALITY OF MODULES

(71) Applicant: Commissariat à l'Energie Atomique et aux Energies Alternatives, Paris (FR)

(72) Inventors: Matthieu Desbois-Renaudin, Villard-des-Lans (FR); Jean-Noël Carminati, Gresy-sur-Aix (FR); Franck Pra, Le Gua (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 470 days.

(21) Appl. No.: 15/733,426

(22) PCT Filed: Jan. 25, 2019

(86) PCT No.: PCT/FR2019/050168
§ 371 (c)(1),
(2) Date: Jul. 26, 2020

(87) PCT Pub. No.: WO2019/145652
PCT Pub. Date: Aug. 1, 2019

(65) Prior Publication Data
US 2021/0098836 A1    Apr. 1, 2021

(30) Foreign Application Priority Data

Jan. 29, 2018    (FR) ...................................... 1850671

(51) Int. Cl.
*H01M 10/61*    (2014.01)
*H01M 10/0525*    (2010.01)
(Continued)

(52) U.S. Cl.
CPC ..... *H01M 10/613* (2015.04); *H01M 10/0525* (2013.01); *H01M 10/647* (2015.04);
(Continued)

(58) Field of Classification Search
CPC .. H01M 10/613; H01M 10/617; H01M 10/61; H01M 10/60; H01M 10/647;
(Continued)

(56) References Cited

U.S. PATENT DOCUMENTS 6,106,972 A    8/2000 Kokubo et al.
7,531,269 B2    5/2009 Wegner
(Continued)

FOREIGN PATENT DOCUMENTS

EP    2200110 A1    6/2010
EP    2426779 A2    3/2012
(Continued)

OTHER PUBLICATIONS

International Search Report for International Application No. PCT/FR2019/050168 dated Apr. 18, 2019, 3 pages.
(Continued)

*Primary Examiner* — Raymond Alejandro
(74) *Attorney, Agent, or Firm* — Jordan IP Law, LLC (57) ABSTRACT

A module (10) for a battery comprises accumulators (20), a first flange (22C) including first through openings, the accumulators being secured with no gluing in the first openings, first electrically-conductive plates (24C), each first plate being connected to the accumulators of a first accumulator assembly, a second flange (22D) including second through openings, the accumulators being secured with no gluing in the second openings, second electrically-conductive plates, each second plate being connected to the accumulators of a second accumulator assembly, and a package (12) delimiting, with the first and second flanges,
(Continued)

first, second, and third chambers containing a dielectric liquid, the first flange including first passages (38C) for the dielectric liquid between the first and second chambers and the second flange including second passages (38D) for the dielectric liquid between the second and third chambers.

9 Claims, 6 Drawing Sheets

(51) Int. Cl.
| | |
|---|---|
| *H01M 10/613* | (2014.01) |
| *H01M 10/647* | (2014.01) |
| *H01M 10/6568* | (2014.01) |
| *H01M 50/213* | (2021.01) |
| *H01M 50/244* | (2021.01) |
| *H01M 50/503* | (2021.01) |
| *H01M 50/522* | (2021.01) |
| *H01M 50/516* | (2021.01) |

(52) U.S. Cl.
CPC ..... *H01M 10/6568* (2015.04); *H01M 50/213* (2021.01); *H01M 50/244* (2021.01); *H01M 50/503* (2021.01); *H01M 50/522* (2021.01); *H01M 50/516* (2021.01)

(58) Field of Classification Search
CPC ......... H01M 10/6568; H01M 10/6567; H01M 10/0525; H01M 50/209; H01M 50/503; H01M 50/507; H01M 50/502
See application file for complete search history.

(56) References Cited

U.S. PATENT DOCUMENTS

| | | |
|---|---|---|
| 9,431,685 B2 | 8/2016 | Dibos et al. |
| 2006/0078789 A1 | 4/2006 | Wegner |
| 2007/0009787 A1 | 1/2007 | Straubel et al. |
| 2008/0318121 A1 | 12/2008 | Takagi |
| 2009/0317698 A1 | 12/2009 | Murata |
| 2011/0008657 A1 | 1/2011 | Chung et al. |
| 2012/0094163 A1 | 4/2012 | Fuller |
| 2013/0122331 A1 | 5/2013 | McDonald |
| 2013/0328392 A1 | 12/2013 | Desbois-Renaudin et al. |
| 2014/0162106 A1 | 6/2014 | Fuerstner |
| 2017/0005384 A1* | 1/2017 | Harris ............... H01M 10/6567 |
| 2018/0040933 A1 | 2/2018 | Inoue |

FOREIGN PATENT DOCUMENTS

| | | |
|---|---|---|
| JP | 2005285455 A | 10/2005 |
| JP | 2007165200 A | 6/2007 |
| WO | 2012013641 A1 | 2/2012 |

OTHER PUBLICATIONS

International Search Report for International Application No. PCT/FR2019/050169 dated Apr. 18, 2019, 3 pages.
Translation of the Written Opinion for the International Searching Authority for International Application No. PCT/FR2019/050169 dated Apr. 18, 2019, 7 pages.
Translation of the Written Opinion for the International Searching Authority for International Application No. PCT/FR2019/050168 dated Apr. 18, 2019, 6 pages.

* cited by examiner

ELECTRIC STORAGE CELL MODULE AND BATTERY COMPRISING A PLURALITY OF MODULES

FIELD

The present invention generally concerns batteries of power storage elements, also called accumulators, connected in series and/or in parallel.

BACKGROUND

A battery comprises one or a plurality of interconnected battery modules. Each battery module comprises an assembly of electric accumulators connected to one another by electric connection elements.

The battery may comprise a system of thermal conditioning of the electric accumulators, which enables to cool or to heat the electric accumulators to improve the performance and the lifetime of the battery. There exist systems of thermal conditioning with air, with water or glycol water, or with a dielectric liquid.

A disadvantage of a system of thermal conditioning with air is the low cooling performance. A disadvantage of a system of thermal conditioning with water is that water and glycol water have a low dielectric strength. The cooling liquid should then be physically separated from all the electric conductors of the battery. The battery structure may then be complex and the cooling performance may be insufficient. Further, in case of a shock, a water leak within the battery may generate a current leakage, or even a short-circuit.

A system of thermal conditioning with a dielectric liquid dielectric has the advantage that the cooling liquid may be in direct contact with the electric conductors and the accumulators. US patent application 2017/0005384 describes a battery comprising a thermal conditioning system capable of using a dielectric liquid. A disadvantage of the battery described in US patent application 2017/0005384 is that it has a complex structure. Further, the battery manufacturing method may comprise steps of gluing of the electric accumulators, which may make disassembly and/or maintenance operations difficult.

SUMMARY

Thus, an object of an embodiment is to at least partly overcome the disadvantages of the previously-described batteries.

An embodiment aims at a battery comprising a system of thermal conditioning of the electric accumulators using a dielectric liquid.

An embodiment aims at a battery having a simple structure.

An embodiment aims at a method of assembly of a battery which comprises no gluing step.

An embodiment aims at a battery adapted to lithium-ion accumulators.

An embodiment aims at a battery for which disassembly and/or maintenance operations are simple.

An embodiment provides a module for a battery comprising:

accumulators, each first accumulator having first and second ends and an intermediate portion coupling the first and second ends;

a first flange comprising first through openings, the first ends of the accumulators being secured with no gluing in the first openings;

first electrically-conductive plates, each first plate being connected to the first end of the accumulators of a first assembly of accumulators among first assemblies of accumulators;

a second flange comprising second through openings, the second ends of the accumulators being secured with no gluing in the second openings;

second electrically-conductive plates, each second plate being connected to the second ends of the accumulators of a second assembly of accumulators among second assemblies of accumulators; and a package containing the accumulators, the first and second flanges, and the first and second plates and delimiting, with the first and second flanges, first, second, and third chambers intended to contain a dielectric liquid, the first flange separating the first and second chambers and the second flange separating the second and third chambers, the first flange comprising first passages for the dielectric liquid between the first and second chambers and the second flange comprising second passages for the dielectric liquid between the second and third chambers.

According to an embodiment, each first plate comprises first holes, each first hole facing one of the first passages, and each second plate comprises second holes, each second hole facing one of the second passages.

According to an embodiment, the first flange comprises pins projecting into the first chamber, the first holes being crossed by said pins.

According to an embodiment, the first flange comprises third openings, different from the first openings, for the passage of the cooling liquid between the first and second chambers and the second flange comprises fourth openings, different from the second openings, for the passage of the cooling liquid between the second and third chambers.

According to an embodiment, each first plate and each second plate comprises a stack of at least first and second electrically-conductive layers made of different materials, the first layer being in mechanical contact with at least two of the accumulators and the second layer being opened opposite said at least two accumulators.

According to an embodiment, the package comprises first and second lateral panels and a tubular central part interposed between the first and second lateral panels and each first and second lateral panel comprises a surface facing the inside of the module, a through duct emerging at each end out of the module and a port communicating with the duct and emerging onto said surface, the port of the first lateral panel emerging into the first chamber and the port of the second lateral panel emerging into the second chamber.

An embodiment also provides a battery comprising a stack of a plurality of modules such as previously defined.

According to an embodiment, the battery comprises a system for compressing the modules of the stack.

According to an embodiment, each first and second lateral panel comprises at least one fifth through opening, the fifth through openings of the modules of the stack being in line with one another, the compression system comprising at least one rod crossing the fifth openings of the modules.

An embodiment also provides a method of manufacturing a module for a battery, comprising the steps of:

assembling accumulators, each accumulator having first and second ends and an intermediate portion coupling the first and second ends, on a first flange comprising first through openings, the first ends of the accumulators being secured with no gluing in the first openings;

assembling the accumulators on a second flange comprising second through openings, the second ends of the accumulators being secured with no gluing in the second openings;

securing first electrically-conductive plates to the accumulators, each first connection plate being connected to the first ends of the accumulators of a first assembly of accumulators among first assemblies of accumulators;

securing second electrically-conductive plates to the accumulators, each second connection plate being connected to the second ends of the accumulators of a second assembly of accumulators among second assemblies of accumulators; and arranging the accumulators, the first and second flanges, and the first and second plates in a package delimiting, with the first and second flanges, first, second, and third chambers intended to contain a dielectric liquid, the first flange separating the first and second chambers and the second flange separating the second and third chambers, the first flange comprising first passages for the dielectric liquid between the first and second chambers, the second flange comprising second passages for the dielectric liquid between the second and third chambers.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

The same elements have been designated with the same reference numerals in the different drawings. For clarity, only those elements which are useful to the understanding of the described embodiments have been shown and are detailed. Further, the various drawings are not to scale.

In the following description, when reference is made to terms qualifying the absolute or relative position, such as the term "upper", "lower", "lateral", or "above", reference is made to the orientation of the drawings or to a battery in a normal position of use. Unless specified otherwise, the terms "about", "approximately", "substantially", and "in the order of" signify within 10%, preferably within 5%, of the value in question.

Figure 1:
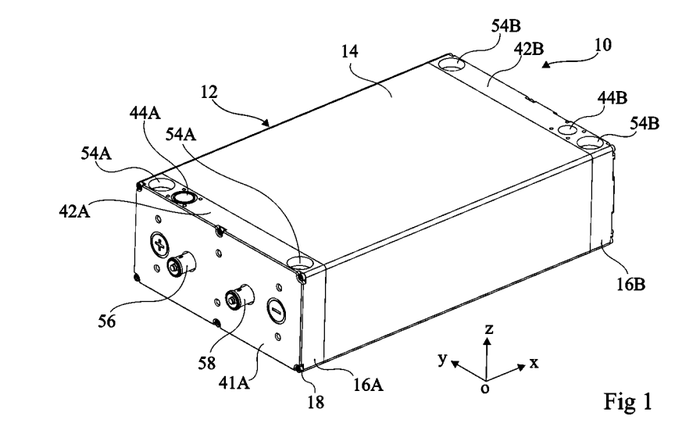
FIGS. 1 to 3 respectively are a perspective view, a cross-section view, and an exploded perspective view, partial and simplified, of an embodiment of an electric accumulator module.
Figure 2:
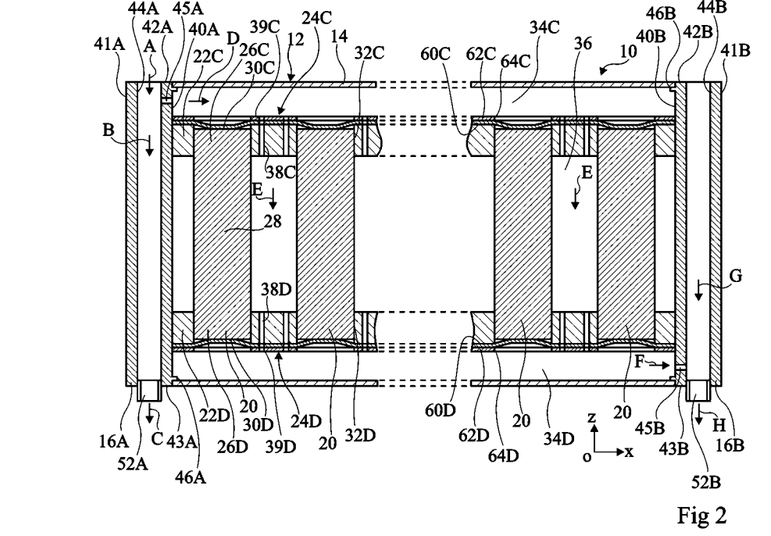
Figure 3:
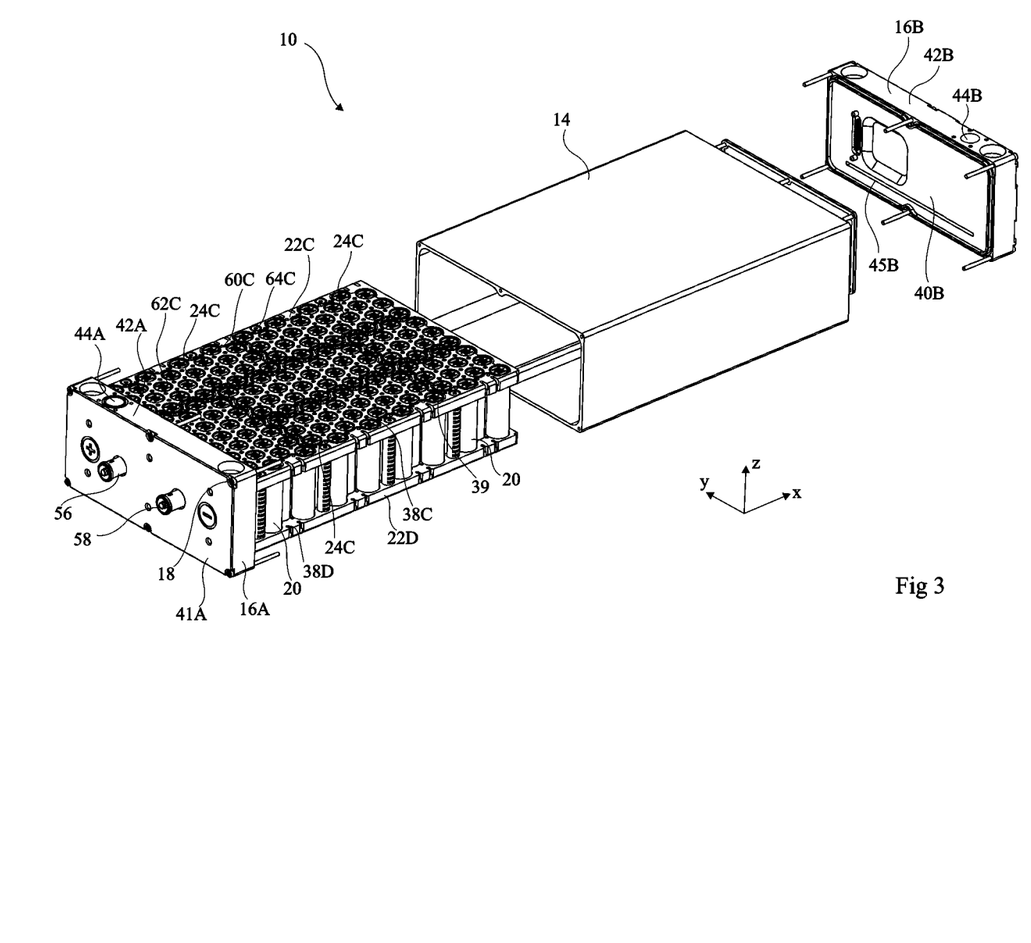
Figure 4:
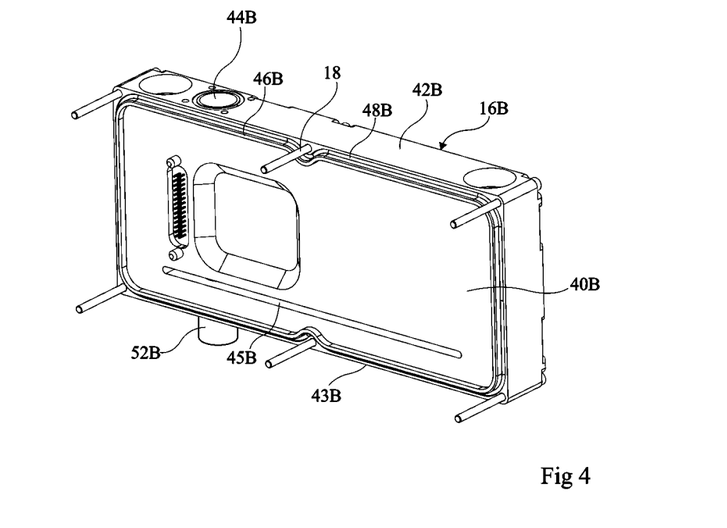
FIG. 4 is a partial simplified perspective view of a portion of the electric accumulator module shown in FIG. 1.

FIGS. 1 to 3 respectively are a perspective view, a cross-section view, and an exploded perspective view of an embodiment of an electric accumulator module 10 and FIG. 4 is a perspective view of a portion of the module 10 shown in FIG. 1. Call (Ox, Oy, Oz) an orthogonal reference frame. FIG. 2 comprises two cross-section views in two different half-planes parallel to plane Oxz.

Module 10 comprises a package 12 formed by a central part 14 and two lateral panels 16A and 16B, FIG. 4 showing lateral panel 16B. Central part 14 has a general tubular shape extending along direction Ox and preferably has a substantially constant cross-section area along direction Ox. Central part 14 may be made of aluminum, for example, by extrusion. Central part 14 is closed at two opposite ends by lateral panels 16A, 16B. In the rest of the disclosure, to designate elements having similar shapes and/or functions of panels 16A and 16B, one uses the same number followed by suffix A to designate the element of lateral panel 16A and followed by suffix B to designate the element of lateral panel 16B. Lateral panels 16A, 16B may be secured to central part 14 by screws 18. According to an embodiment, package 12 is inscribed within a cuboid having a dimension along direction Ox in the range from 200 mm to 400 mm, for example, approximately 300 mm, having a dimension along direction Oy in the range from 140 mm to 250 mm, for example, approximately 200 mm, and having a dimension along direction Oz in the range from 70 mm to 110 mm, for example, approximately 90 mm. Central part 14 may comprise protrusions, not shown in FIG. 3, extending along direction Ox and projecting into the internal volume of central part 14.

Certain elements of module 10 are symmetrical with respect to a plane of symmetry parallel to plane Oxy. In the rest of the disclosure, to designate elements of module 10 at least partly symmetrical with respect to this plane of symmetry, one uses as a reference the same number followed by suffix C to designate the element located on one side of the plane of symmetry and followed by suffix D to designate the element located on the other side of the plane of symmetry.

Module 10 contains in package 12:
electric accumulators 20;
an upper flange 22C and a lower flange 22D for holding accumulators 20; and
upper connection plates 24C resting on upper flange 22C and electrically coupling accumulators 20 and lower connection plates 24D resting on lower flange 22D and electrically coupling accumulators 20.

Module 10 may comprise from 2 to 500 accumulators 20. As shown in FIG. 2, each accumulator 20 comprises first and second ends 26C, 26D and an intermediate portion 28 extending between the two ends 26C, 26D. Accumulators 20 for example have a generally cylindrical shape, particularly with a circular base, or a prismatic shape of axis Oz. Accumulators 20 are for example lithium-ion accumulators, particularly lithium-ion accumulators of lithium iron phosphate accumulator or LFP accumulator type, lithium-ion accumulators of nickel manganese cobalt or NMC accumulator type, lithium-ion accumulators of lithium nickel cobalt aluminum oxide or NCA accumulator type, lithium-ion accumulators of lithium manganese oxide or LMO accumulator type. The length of accumulators 20 along axis Oz may vary from 30 mm to 110 mm, and may for example approximately be 65 mm. In the case of cylindrical accumulators 20 with a circular base, the diameter of each accumulator 20 may be in the range from 10 mm to 27 mm, and may for example approximately be 18 mm. Each accumulator 20 further comprises first and second electric terminals 30C, 30D. For each accumulator 20, the first terminal 30C is preferably located on the first end 26C and the second terminal 30D is preferably located on second end 26D.

The dimension of each flange 22C, 22D along direction Ox is substantially equal to the dimension of central part 14 along direction Ox. The dimension of each flange 22C, 22D along direction Oy is substantially equal to the maximum dimension along direction Oy of the internal volume of central part 14. Each flange 22C, 22D may comprise grooves, not shown in the drawings, having the protrusions of central part 14 housed therein. Flanges 22C, 22D may be made of any electrically-insulating material having a good mechanical strength such as for example polyoxymethylene (POM), polyamide (PA, particularly PA66), polyetheretherketone (PEEK), but also materials based on wood.

Each flange 22C, 22D comprises through openings 32C, 32D, shown in FIG. 2, having the ends 26C, 26D of accumulators 20 housed therein. More particularly, for each accumulator 20, the end 26C of accumulator 20 is housed in one of the openings 32C of upper flange 22C and the end 26D of accumulator 20 is housed in one of the openings 32D of lower flange 22D. According to an embodiment, openings 32D are oriented along direction Oz and have a shape complementary to that of ends 26C, 26D of accumulators 20. According to the desired connection of accumulators 20, for each accumulator 20, the positive terminal of accumulator 20 may be located at the level of upper flange 22C or of lower flange 22D. Accumulators 20 may be arranged in quincunx. The distance between the axes of two adjacent accumulators may be in the range from 18.5 mm to 22 mm, for example, approximately 20 mm. The minimum interval between two adjacent accumulators 20 may be in the range from 0.5 mm to 4 mm, for example, approximately 2 mm.

According to an embodiment, each accumulator 20 is tightly assembled in the associated openings 32C, 32D. Preferably, there is no glue used for the securing of accumulators 20 to flanges 22C, 22D.

Upper flange 22C delimits an upper chamber 34C with the central part 14 of package 12. Lower flange 22D delimits a lower chamber 34D with central part 14. Flanges 22C, 22D together delimit an intermediate chamber 36. Chambers 34C, 34D, and 36 are shown in FIG. 2.

Each connection plate 24C, 24D couples the positive or negative terminals of a first assembly of accumulators 20 with the negative or positive terminals of a second assembly of accumulators 20. The assembly of accumulators 20 and of connection plates 24C, 24D forms an electric circuit where accumulators 20 are connected in series and/or in parallel between first and second access nodes, each access node corresponding to one of connection plates 24C or 24D. The orientations of accumulators 20 and the layout and the dimensions of connection plates 24C, 24D enable to obtain the desired series/parallel connection of accumulators 20. According to an embodiment, the number of accumulators 20 connected to each connection plate 24C, 24D varies from 2 to 500 accumulators 20. According to an embodiment, each connection plate 24C, 24D is connected to the positive terminal of from 1 to 500 accumulators 20 and to the negative terminal of from 1 to 500 accumulators 20. Two adjacent connection plates 24C or 24D are spaced apart by a distance which particularly depends on the voltage delivered by module 10, for example, preferably of at least two millimeters for a 60-V voltage delivered by the module and preferably of at least 6 mm for a 400-V voltage delivered by the module.

Each flange 22C, 22D comprises additional through openings 38C, 38D oriented along direction Oz. According to an embodiment, each additional through opening 38C, 38D is cylindrical, of axis Oz, with a circular base. The diameter of each additional through opening 38C, 38D is in the range from 0.5 mm to 5 mm.

Connection plates 24C, 24D comprise through holes 39C, 39D in line with additional openings 38C, 38D. Intermediate chamber 36 communicates with upper chamber 34C only via holes 38C and 39C and intermediate chamber 36 communicates with lower chamber 34D only via openings 38D and 39D. According to an embodiment, each through hole 39C, 39D is cylindrical, of axis Oz, with a circular base. The diameter of each through hole 39C, 39D may be substantially equal to that of additional through openings 38C, 38D. Connection plates 24C, 24D may be cut in a same plate.

According to an embodiment, the two lateral panels 16A, 16B have at least partly symmetrical structures, particularly as concerns the flowing of the cooling liquid. According to an embodiment, each panel 16A, 16B is inscribed within a cuboid and comprises two opposite main surfaces 40A, 40B, 41A, 41B and edges coupling the main surfaces, including an upper edge 42A, 42B and a lower edge 43A, 43B, opposite to upper edge 42A, 42B. Main surface 40A is oriented towards the inside of module 10. Lateral panels 16A, 16B may be made of any type of material having a sufficient mechanical resistance (resistance to a 105-Pa (1-bar) internal pressure of the module and of the oil collectors, for example, and compatible with the dielectric fluid used (for example, POM, PA66, or PEEK). A use of an electrically-conductive material (injected aluminum, for example) is possible if a specific precaution is taken to electrically insulate the electric power paths of the lateral panels.

According to an embodiment, each lateral panel 16A, 16B comprises a through duct 44A, 44B, for example, a cylindrical duct with a circular base, which extends along direction Oz and emerges onto upper edge 42A, 42B and onto lower edge 43A, 43B. Duct 44A, 44B communicates with an elongated port 45A, 45B which emerges onto surface 40A, 40B towards the inside of package 12. The elongated shape of port 45A, 45B enables to obtain a more homogeneous distribution of the cooling liquid in chambers 34C, 34D. As a variant, elongated port 45A, 45B may be replaced with a point-shaped port. Elongated port 45A, 45B for example extends along direction Oy. Lateral panels 16A, 16B are arranged in module 10 so that the elongated port 45A of lateral panel 16A emerges into upper chamber 34C and that the elongated port 45B of lateral panel 16B emerges into lower chamber 34D. According to an embodiment, each panel 16A, 16B comprises an end piece 52A, 52B in line with duct 44A, 44B at the end located on the side of lower edge 43A, 43B. As a variant, end pieces 52A, 52B are not present and are replaced with O-rings. As shown in FIGS. 2 and 4, each lateral panel 16A, 16B comprises an edge 46A, 46B which extends on surface 40A, 40B towards the inside of module 10 and which nests into central part 14. Each lateral panel 16A, 16B comprises a sealing ring, not shown in FIG. 2, on surface 40A, 40B, only sealing ring 48B being shown in FIG. 4. Edges 46A, 46B and sealing rings 48B enable to obtain a tight connection between lateral panels 16A, 16B and central part 14.

In operation, a dielectric cooling liquid is intended to flow through module 10. The dielectric cooling liquid may be selected from the group comprising a synthetic oil and a poly-alpha-olefin oil, a natural or synthetic ester, a mineral electric transformer oil, or any other fluid having a dielectric rigidity enabling to insulate the cells from one another in any circumstance of use of the system. As a non-limiting example, the dielectric cooling liquid is selected from the group comprising perfluorohexane, perfluoromethylcyclohexane, perfluoro-1,3-dimethylcyclohexane, perfluorodecalin, perfluoromethyldecalin, trichlorofluoromethane, trichlorotrifluoroethane, methanol, and ethanol. As shown in FIG. 2, the cooling liquid penetrates into module 10 through duct 44A (arrow A). The cooling liquid then divides into a portion which continues its travel through duct 44A (arrow B) until it comes out of module 10 (arrow C) and a portion which penetrates into upper chamber 34C through elongated port 45A (arrow D). From upper chamber 34C, the cooling liquid then penetrates into intermediate chamber 36 through openings 38C and holes 39C. The cooling liquid then flows through intermediate chamber 36 in contact with accumulators 20 (arrows E). In intermediate chamber 36, the cooling liquid mainly flows along direction Oz. From intermediate chamber 36, the cooling liquid then penetrates into lower chamber 34D through openings 38D and holes 39D. From lower chamber 34D, the cooling liquid flows into duct 44B via elongated port 45B (arrow F). The cooling liquid coming from elongated port 45B mixes with the cooling liquid flowing through duct 44B (arrow G) and leaves module 10 (arrow G). The flowing of the cooling liquid in contact with accumulators 20 enables to obtain an optimal cooling performance. The dimensions and the distribution of openings 38C, 38D are selected so that the flowing of the cooling liquid is substantially homogeneous in intermediate chamber 36.

Each lateral panel 16A, 16B further comprises at least two through openings 54A, 54B for example having a cylindrical shape with a circular base, which extend along direction Oz. As described in further detail hereafter, openings 54A, 54B are used for the securing of a plurality of modules 10 together.

Lateral panel 16A further comprises two electric terminals 56, 58 for example located on the large surface 41A of lateral panel 16A. Electric terminal 56 is electrically coupled to the connection plate 24C or 24D corresponding to the first access node of the electric circuit formed by accumulators 20 by an electric conductor, not shown in the drawings, and electric terminal 56 is electrically coupled to the connection plate 24C or 24D corresponding to the second access node of the electric circuit formed by accumulators 20 by electric conductors, not shown in the drawings.

Module 10 may further comprise sensors, not shown, capable of measuring different signals during the operation of module 10. As an example, the sensors may comprise at least one temperature sensor to measure the temperature in the vicinity of accumulators 20. Preferably, module 10 comprises a plurality of temperature sensors. As an example, the sensors may comprise sensors of the voltages across accumulators 20. Module 10 may further comprise at least one heating element used to heat accumulators 20.

According to an embodiment, module 10 may comprise a printed circuit, for example, a flexible printed circuit, not shown, having the sensors and/or the heating elements provided thereon. The flexible printed circuit then comprises electrically-conductive tracks, for example, made of copper, on a support film, and electronic components or electronic circuits are secured to the conductive tracks. As an example, when the flexible printed circuit comprises a heating element used to heat accumulators 20, the latter may correspond to a resistive track or to a copper track having an adapted cross-section and length to generate heat when it conducts a current. According to an embodiment, the flexible printed circuit may comprise a RFID tag (radiofrequency identification). The flexible printed circuit may be connected to the battery accumulators 20. The printed circuit may be coupled to a processing module located outside or inside of module 10, for example, by electric conductors, particularly a flexible sheet, crossing lateral panel 16B with an opening shown in FIGS. 3 and 4.

The maximum thickness of each connection plate 24C, 24D is in the range from 0.2 mm to 2 mm. In the present embodiment, each connection plate 24C, 24D comprises a stack of at least a first electrically-conductive layer 60C, 60D and of a second electrically-conductive layer 62C, 62D, shown in FIG. 2. First layer 60C, 60D is in mechanical contact with accumulators 20. Second layer 62C, 62D comprises openings 64C, 64D located opposite accumulators 20. According to an embodiment, first layer 60C, 60D is made of a material selected from the group comprising nickel-plated steel, nickel, nickel-plated copper, and any material allowing an easy welding on the accumulators. The thickness of first layer 60C, 60D is in the range from 0.1 mm to 0.5 mm. According to an embodiment, second layer 62C, 62D is made of a material selected from the group comprising copper, aluminum, beryllium copper, and any material with a good electric conductivity. The thickness of second layer 62C, 62D is in the range from 0.2 mm to 2 mm. The electric conductivity properties of connection plate 24C, 24D are essentially ensured by second layer 62C, 62D while the material forming first layer 60C, 60D is particularly selected to obtain an electric connection of good quality with accumulators 20, particularly to ease the welding of first layer 60C, 60D to accumulators 20.

An embodiment of a method of manufacturing a module 10 comprises the steps of:
  arranging accumulators 20 on one of flanges 22C and then adding flange 22D;
  arranging each connection plate 24C on upper flange 22C, securing each connection plate 24C to the accumulators, for example, by electric welding, arranging each connection plate 24D on lower flange 22C and securing each connection plate 24C to accumulators 20, for example, by electric welding;
  inserting the assembly comprising accumulators 20, flanges 22C, 22D, and connection plates 24C, 24D into central part 14; and
  securing lateral panels 16A, 16B to central part 14.

The electric circuit formed by accumulators 20 may easily be modified by changing the layout and the dimensions of connection plates 24C, 24D and/or by changing the orientation of accumulators 20 without modifying package 12 or flanges 22C, 22D. Module 10 may thus easily be modified to adapt to different applications.

The mechanical connections between flanges 22C, 22D and the central portion 14 of package 12, between flanges 22C, 22D and accumulators 20, and between connection plates 24C, 24D and accumulators 20 ensure the rigidity of the assembly and the holding of accumulators 12.

Figure 5:
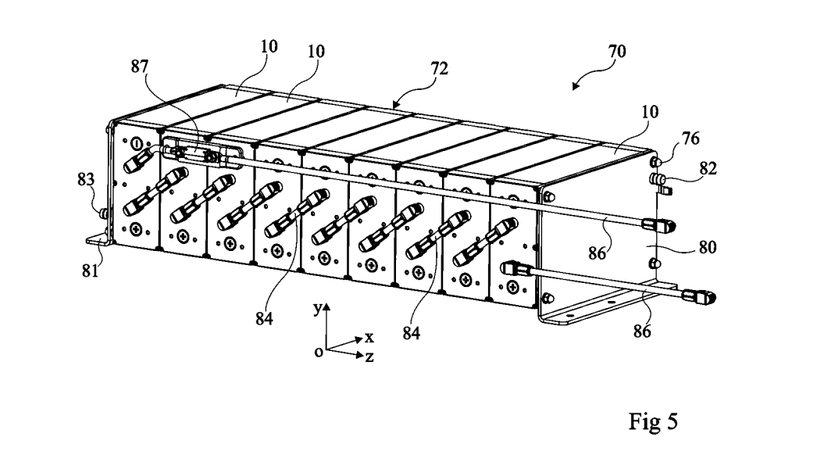
FIGS. 5 and 6 respectively are a perspective view and an exploded perspective view, partial and simplified, of an embodiment of a battery.
Figure 6:
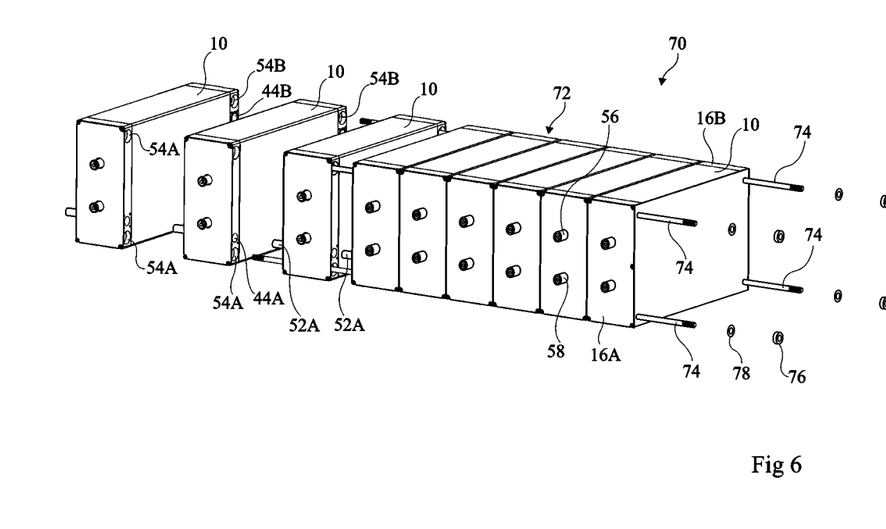

FIGS. 5 and 6 respectively are a perspective view and an exploded perspective view of an embodiment of a battery 70. Battery 70 comprises a stack 72 of nine modules 10 arranged so that, except for the lateral panels 16A, 16B of the module located at one of the ends of stack 72, the end piece 52A of each lateral panel 16A penetrates into the duct 44A of the next lateral panel 16A of stack 72 and so that the end piece 52B of each lateral panel 16B penetrates into the duct 44B of the next lateral panel 16B of stack 72. The through openings 54A of lateral panels 16A are then located in line with one another and the through openings 54B of lateral panels 16B are then located in line with one another.

Module 10 are secured to one another by rods 74 which extend in through openings 54A, 54B. Nuts 76 and washers 78 provided at the end of rods 74 enable to compress modules 10. Advantageously, once modules 10 have been pressed against one another by rods 74, each end piece 52A, 52B forms, with the duct 44A, 44B into which it penetrates, a connection which is tight to the cooling liquid.

As shown in FIG. 5, battery 70 may comprise end plates 80, 81 located at each end of stack 72 and secured to stack 72 via rods 74. End plates 80, 81 may enable to secure battery 70 to a support, not shown. Each end plate 80, 81 comprises a tubular element 82, 83 having its opening thoroughly crossing end plate 80, 81. The tubular element 82 of end plate 80 is located in line with the duct 44A of the adjoining lateral panel 16A while end plate 80 totally obstructs the duct 44B of the adjoining lateral panel 16B. The tubular element 83 of end plate 81 is located in line with the duct 44B of the adjoining lateral panel 16B, end piece 52B being capable of penetrating into tubular element 82B, while end plate 81 totally obstructs the duct 44A of the adjoining lateral panel 16A.

According to an embodiment, battery 70 comprises electric connectors 84, shown in FIG. 5, electrically coupling modules 10 to one another and located outside of modules 10. In the present embodiment, modules 10 are series-connected, that is, for each module 10 except for the two modules located at the ends of stack 72, a first connector 84 couples electric terminal 56 to the electric terminal 58 of one of the two adjacent modules 10 and a second connector 84 couples electric terminal 58 to the electric terminal 56 of the other one of the adjacent modules. Two electric connectors 86 are coupled to the electric terminals 56, 58 of the modules 10 located at the ends of stack 72 which are not connected to another module 10. A fuse 87 may be provided on one of connectors 86.

Battery 70 may comprise, in addition to end plates 80, 81 or instead of one and/or of the other one of end plates 80, 81, at least one additional element, which may be secured to stack 72 by rods 74, such as a hydraulic pump capable of driving the cooling liquid in modules 10, a heat exchanger, particularly to cool the cooling liquid, or an electric connection block.

The flowing of the cooling liquid in modules 10 is implemented by a pump, not shown, which injects the cooling liquid through tubular element 82. The cooling liquid then supplies each module 10 via communicating ducts 44A. After having crossed each module 10, as previously described, the cooling liquid is recovered in ducts 44B and is discharged by tubular element 83.

In the case where each module 10 comprises sensors, all the sensors of the modules may be coupled to a processing unit. The processing unit may correspond to a dedicated circuit or may comprise a processor, for example, a microprocessor or a microcontroller, capable of executing instructions of a computer program stored in the memory. The processing unit may plays the role of a system for controlling the battery capable, for example, of monitoring the voltages of accumulators 20 to remain within an authorized operating range, of monitoring the charge level of accumulators 20, and possibly of achieving the balance of these charges, of regulating the charge current during recharge periods, of regulating the discharge current, etc.

An embodiment of a method of manufacturing battery 70 comprises the steps of:
  manufacturing the modules 10 forming battery 70 as previously described;
  forming the stack 72 of modules 10;
  inserting rods 74 and compressing modules 10; and
  arranging connectors 84, 86.

At least two batteries 70 having the structure shown in FIG. 5, possibly with a different number of modules 10, may be connected in series and/or in parallel according to the targeted application.

As an example, the number of series-connected accumulators 20 of the battery may vary from four, particularly for a battery 70 delivering a voltage in the order of 12 V, to more than one hundred, particularly for a battery delivering a voltage greater than 700 V or 1,000 V. Battery 70 is for example intended to be used to power a laptop computer or a wireless screw gun, for example with four series-connected accumulators, an electric power-assisted bike, an electric car, or another electric vehicle.

Figure 7:
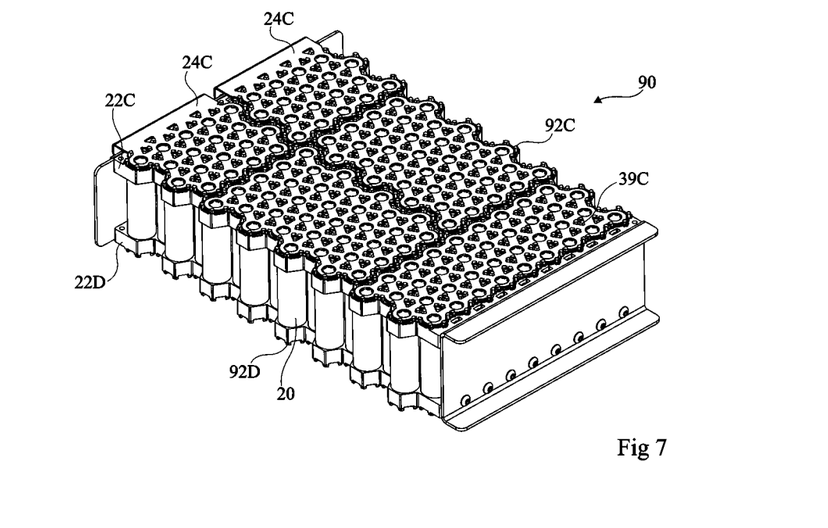
FIG. 7 is a partial simplified perspective view of another embodiment of an electric accumulator module.

FIG. 7 is a partial simplified perspective view of another embodiment of an electric accumulator module 90, where package 12 is not shown. Module 90 comprises all the elements of module 10. Each flange 22C, 22D further comprises pins 92C, 92D directed towards connection plates 24C, 24D. Some pins 92C, 92D extend through the holes 39C, 39D of connection plates 24C, 24D. Pins 92C, 92D enable to ease the positioning of connection plates 24C, 24D, particularly before they are secured to accumulators 20. Additional through openings 38C, 38D may cross flanges 22C, 22D substantially at the center of pins 92C, 92D.

Figure 8:
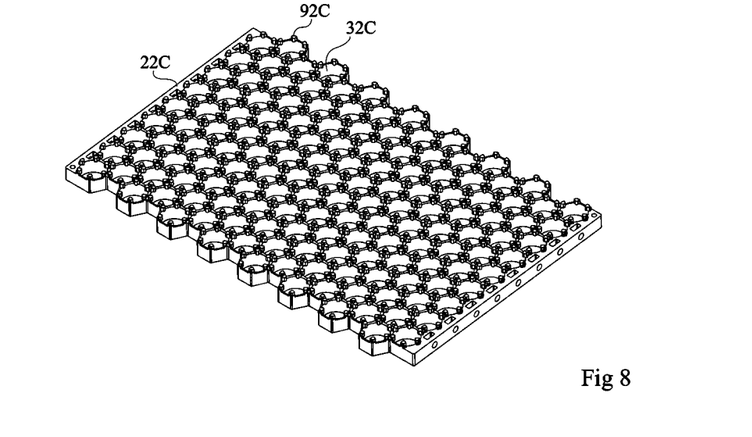
FIGS. 8 and 9 respectively are a partial simplified perspective and a top view of a flange of the module shown in FIG. 7.
Figure 9:
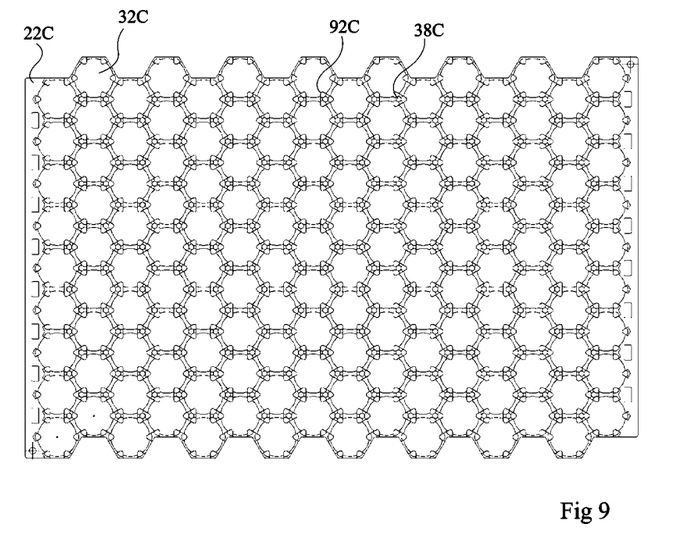

FIGS. 8 and 9 respectively are a perspective view and a top view, partial and simplified, of the upper flange 22C of the module 90 shown in FIG. 7. As shown in FIG. 9, except for the pins 92C located on the sides of flange 22C, each pin 92C has, in top view, a cross-section inscribed within an equilateral triangle. Further, each pin 92C overhangs at least one of through openings 32C, 32D. Pins 92C thus play the role of stops along direction Oz when accumulators 20 are arranged on flanges 22C, 22D.

Figure 10:
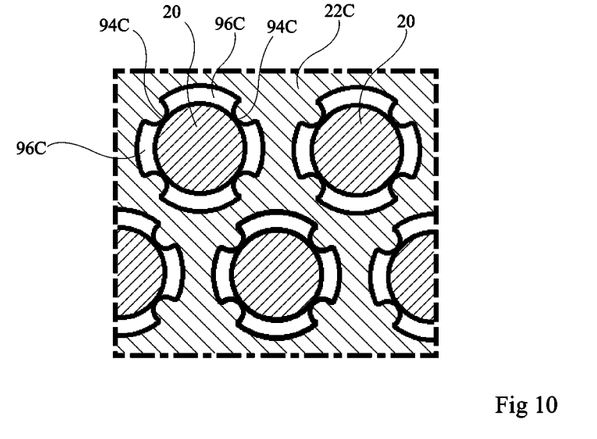
FIG. 10 is a partial simplified cross-section view of another embodiment of an electric accumulator module.

FIG. 10 is a partial simplified cross-section view of another embodiment of the flange 22C of the module 10 of electric accumulators 20, and flange 22D may have an identical structure. The cross-section plane is parallel to plane Oxy. In the present embodiment, flange 22C comprises no additional openings 38C. Further, each opening 32C does not form a tight connection with the accumulator 20 that it receives. Each opening 32C comprises protrusions 94C in contact with accumulator 20 and delimiting with accumulator 20 passages 96C. Passages 96C play the same role as additional openings 38C, 38D. Accumulator 20 is tightly assembled in opening 32C and is held by protrusions 94C.

Various embodiments have been described. Various alterations and modifications will occur to those skilled in the art. In particular, although in the previously-described embodiments, the compressing of modules 10 is performed via rods 74, it should be clear that any system for compressing modules 10 may be used. As an example, rods 74 may be replaced with a clamp which clamps the modules against one another, or a strap which surrounds stack 72 of modules 10.

Various embodiments with different variations have been described hereabove. It should be noted that those skilled in the art may combine these various embodiments and variations without showing any inventive step.

What is claimed is:

1. A module for a battery comprising:
   accumulators, each accumulator having first and second ends and an intermediate portion coupling the first and second ends;
   a first flange comprising first through openings, the first ends of the accumulators being secured with no gluing in the first through openings;
   first electrically-conductive plates, each first electrically-conductive plate being connected to the first ends of some of the accumulators;
   a second flange comprising second through openings, the second ends of the accumulators being secured with no gluing in the second through openings;
   second electrically-conductive plates, each second electrically-conductive plate being connected to the second ends of some of the accumulators; and
   a package containing the accumulators, the first and second flanges, and the first and second electrically-conductive plates and delimiting, with the first and second flanges, first, second, and third chambers configured to contain a dielectric liquid, the first flange separating the first and second chambers and the second flange separating the second and third chambers, the first flange comprising first passages for the dielectric liquid between the first and second chambers and the second flange comprising second passages for the dielectric liquid between the second and third chambers.

2. The module according to claim 1, wherein each first plate comprises first holes, each first hole facing one of the first passages, and wherein each second plate comprises second holes, each second hole facing one of the second passages.

3. The module according to claim 2, wherein the first flange comprises pins projecting into the first chamber, the first holes being crossed by said pins.

4. The module according to claim 1, wherein the first flange comprises third openings, different from the first openings, for the passage of the dielectric liquid between the first and second chambers and wherein the second flange comprises fourth openings, different from the second openings, for the passage of the dielectric liquid between the second and third chambers.

5. The module according to claim 1, wherein each first electrically- conductive plate and each second electrically-conductive plate comprises a stack of at least first and second electrically-conductive layers made of different materials, the first electrically-conductive layer being in mechanical contact with at least two accumulators of the accumulators and the second electrically-conductive layer comprising openings opposite said at least two accumulators.

6. The module according to claim 1, wherein the package comprises first and second lateral panels and a tubular central part interposed between the first and second lateral panels and wherein each first and second lateral panel comprises a surface facing the inside of the module, a through duct emerging at each end out of the module and a port communicating with the through duct and emerging onto said surface, the port of the first lateral panel emerging into the first chamber and the port of the second lateral panel emerging into the second chamber.

7. A battery comprising a stack of a plurality of modules according to claim 1.

8. The battery of claim 7, comprising a system for compressing the plurality of modules of the stack.

9. The battery according to claim 8, wherein the package comprises first and second lateral panels and a tubular central part interposed between the first and second lateral panels and wherein each first and second lateral panel comprises a surface facing the inside of the module, a through duct emerging at each end out of the module and a port communicating with the duct and emerging onto said surface, the port of the first lateral panel emerging into the first chamber and the port of the second lateral panel emerging into the second chamber, and wherein each first and second lateral panel comprises at least one fifth through opening, the fifth through openings of the modules of the stack being in line with one another, the compression system comprising at least one rod crossing the at least one fifth through opening of the plurality of modules.

* * * * *